(No Model.)
A. L. LISTON.
HARNESS SADDLE.
No. 353,690. Patented Dec. 7, 1886.
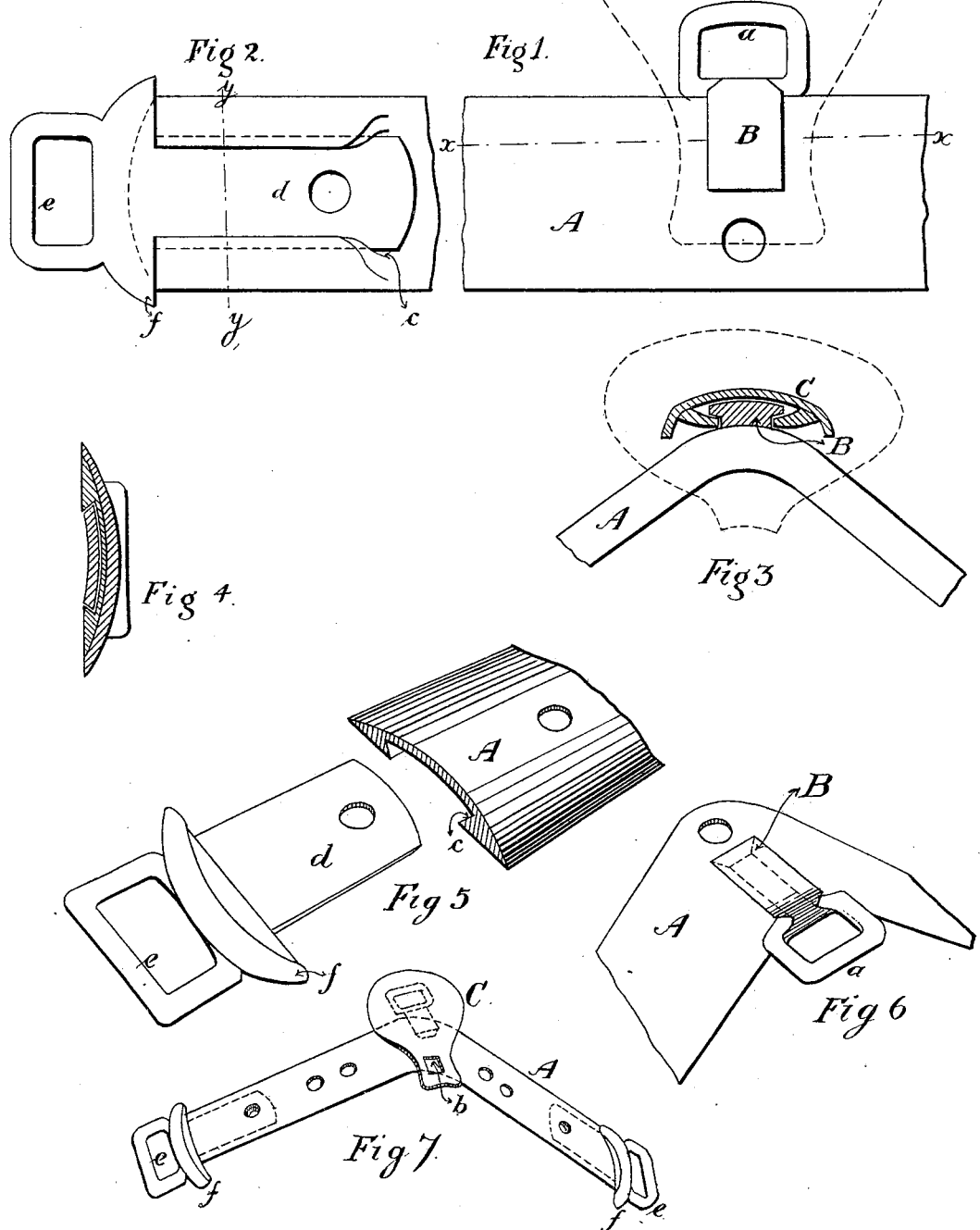
WITNESSES:
Arthur S. Jennings.
C. Sedgwick
INVENTOR:
A. L. Liston
BY Munn & Co
ATTORNEYS.

UNITED STATES PATENT OFFICE.

ALBERT L. LISTON, OF PLEASANT PLAINS, ILLINOIS.

HARNESS-SADDLE.

SPECIFICATION forming part of Letters Patent No. 353,690, dated December 7, 1886.

Application filed March 22, 1886. Serial No. 196,106. (No model.)

*To all whom it may concern:*

Be it known that I, ALBERT L. LISTON, of Pleasant Plains, in the county of Sangamon and State of Illinois, have invented a new and useful Improvement in Harness-Saddles, of which the following is a specification, reference being had to the annexed drawings, forming a part thereof, in which—

Figure 1 is a partial plan view. Fig. 2 is an inverted plan view of one of the ends of the saddle-tree. Fig. 3 is a vertical transverse section taken on line $x\ x$ in Fig. 1. Fig. 4 is a transverse section taken on line $y\ y$ in Fig. 2, looking toward the end of the saddle-tree. Fig. 5 is a perspective view of the end of the saddle-tree and loop for supporting the thill-strap. Fig. 6 is a perspective view of the top of the saddle-tree. Fig. 7 is a perspective view of the saddle tree with the saddle attached.

Similar letters of reference indicate corresponding parts in the different figures of the drawings.

The object of my invention is to provide a saddle-tree for a harness in which the loops and various parts connected therewith, for receiving the straps and other parts of the harness, are secured by dovetailed tongues and grooves, in connection with retaining screws or bolts.

The tree A is provided at the apex thereof with a dovetailed tongue, B, which projects beyond the edge of the tree, and is provided with a loop, $a$, for receiving the back-strap of the harness. To the dovetailed tongue B is fitted the saddle C, which is provided with a dovetailed groove adapted to receive the tongue, and which, when in place on the tree, extends over the loop $a$.

The saddle C is provided with an opening, $b$, for receiving hook-bolts, which are secured in tree A by means of nuts. In the ends of the tree, on the under surface thereof, are formed dovetailed grooves $c$, to which are fitted tongues $d$, carrying at their outer ends loops $e$, for receiving the trace-supporting straps. The tongue $d$ is provided with a curved rib, F, which adjoins the end of the tree A, and forms the end finish. The tongue $d$, besides being held in the groove $c$, is secured by a pad-screw inserted in holes in the tree and in the tongue.

The saddle C is put in place before the pad is in place upon the tree, and the pad and skirts of the saddle are secured upon the tree A by pad-screws and terrets after the pad is in place upon the tree.

By means of my improvement the loops $e$ and saddle C are easily applied to the tree A, and are securely held in place.

My improvement not only cheapens the construction of harness-saddles, by rendering the different parts secure without an undue amount of fitting, but it permits of readily applying the covers and pads, and permits of easily removing them.

Having thus described my invention, what I claim as new, and desire to secure by Letters Patent, is—

1. The saddle-tree having at its apex a transverse dovetailed tongue provided with the back-strap loop, in combination with the saddle having in its under side a socket to adapt it to fit upon said tongue, and having an aperture to receive means for its connection to the saddle-tree, substantially as and for the purpose set forth.

2. The saddle-tree having a transverse dovetailed tongue at its apex and dovetailed grooves at its ends, in combination with the saddle having a dovetailed groove to receive said tongue, and the tongues provided with loops and fitting in said grooves in the ends of the saddle-tree, substantially as and for the purpose set forth.

3. As an improved article of manufacture, a harness-saddle formed of the tree A, provided with the dovetailed tongue B, and with the dovetailed groove $c$, the saddle C, having a dovetailed groove adapted to receive the tongue B, and the tongues $d$, provided with loops $e$, and with the curved rib $f$, the tongues $d$ being adapted to be received in the dovetailed grooves $c$, substantially as shown and described.

ALBERT L. LISTON.

Witnesses:
JOHN L. ROBERTS,
STERLING P. CARTER.